(12) United States Patent
Vermeulen et al.

(10) Patent No.: US 11,693,196 B2
(45) Date of Patent: Jul. 4, 2023

(54) PHOTONIC DIE ALIGNMENT

(71) Applicant: Analog Photonics LLC, Boston, MA (US)

(72) Inventors: Diedrik Vermeulen, Boston, MA (US); Ehsan Shah Hosseini, Boston, MA (US); Michael J. Whitson, Salem, MA (US)

(73) Assignee: Analog Photonics LLC, Boston, MA (US)

( * ) Notice: Subject to any disclaimer, the term of this patent is extended or adjusted under 35 U.S.C. 154(b) by 4 days.

(21) Appl. No.: 17/553,904

(22) Filed: Dec. 17, 2021

(65) Prior Publication Data

US 2022/0107474 A1 Apr. 7, 2022

Related U.S. Application Data

(62) Division of application No. 16/815,655, filed on Mar. 11, 2020, now Pat. No. 11,237,344.

(60) Provisional application No. 62/971,321, filed on Feb. 7, 2020, provisional application No. 62/817,488, filed on Mar. 12, 2019.

(51) Int. Cl.
*G02B 6/42* (2006.01)

(52) U.S. Cl.
CPC ......... *G02B 6/4232* (2013.01); *G02B 6/4206* (2013.01); *G02B 6/4214* (2013.01); *G02B 6/4238* (2013.01); *G02B 6/4274* (2013.01)

(58) Field of Classification Search
CPC ...... G02B 6/4232; G02B 6/4206; G02B 6/42; G02B 6/4214; G02B 6/4238
USPC .......................................................... 385/52
See application file for complete search history.

(56) References Cited

U.S. PATENT DOCUMENTS

| | | | |
|---|---|---|---|
| 7,303,339 | B2 | 12/2007 | Zhou et al. |
| 9,470,855 | B1 | 10/2016 | Shubin et al. |
| 9,698,564 | B1 | 7/2017 | Shubin et al. |
| 10,302,859 | B1 | 5/2019 | Martin et al. |
| 10,620,377 | B1 | 4/2020 | Burckel et al. |
| 2002/0149530 | A1 | 10/2002 | Ballantine et al. |
| 2011/0069973 | A1 | 3/2011 | Krishnamoorthy et al. |
| 2014/0161385 | A1 | 6/2014 | Lessard et al. |
| 2017/0199328 | A1 | 7/2017 | Shubin et al. |

(Continued)

OTHER PUBLICATIONS

Theurer et al., "Flip-Chip Integration of InP and SiN", IEEE Photonics Technology Letters, vol. 31, No. 3, Feb. 1, 2019, pp. 273-276.

*Primary Examiner* — Kaveh C Kianni
(74) *Attorney, Agent, or Firm* — Young Basile Hanlon & MacFarlane, P.C.

(57) ABSTRACT

A first photonic die has a first coupling edge and a first die surface, and comprises: a first waveguide extending in proximity to the first coupling edge; a portion of the first die surface forming an alignment edge substantially parallel to the first waveguide; and a first alignment feature etched into or formed adjacent to the first coupling edge. A second photonic die has a second coupling edge and a second die surface, and comprises: a second waveguide extending in proximity to the second coupling edge; a portion of the second die surface configured to form a receptacle sized to constrain a position of the alignment edge; and a second alignment feature etched into or formed adjacent to the second coupling edge and configured to enable alignment with the first alignment feature when the first photonic die and the second photonic die are substantially aligned with each other.

4 Claims, 7 Drawing Sheets

(56) References Cited

U.S. PATENT DOCUMENTS

| | | |
|---|---|---|
| 2018/0067343 A1 | 3/2018 | Krasulick et al. |
| 2019/0094460 A1 | 3/2019 | Brusberg et al. |
| 2020/0049890 A1 | 2/2020 | Patel et al. |
| 2020/0278506 A1 | 9/2020 | Aalto et al. |

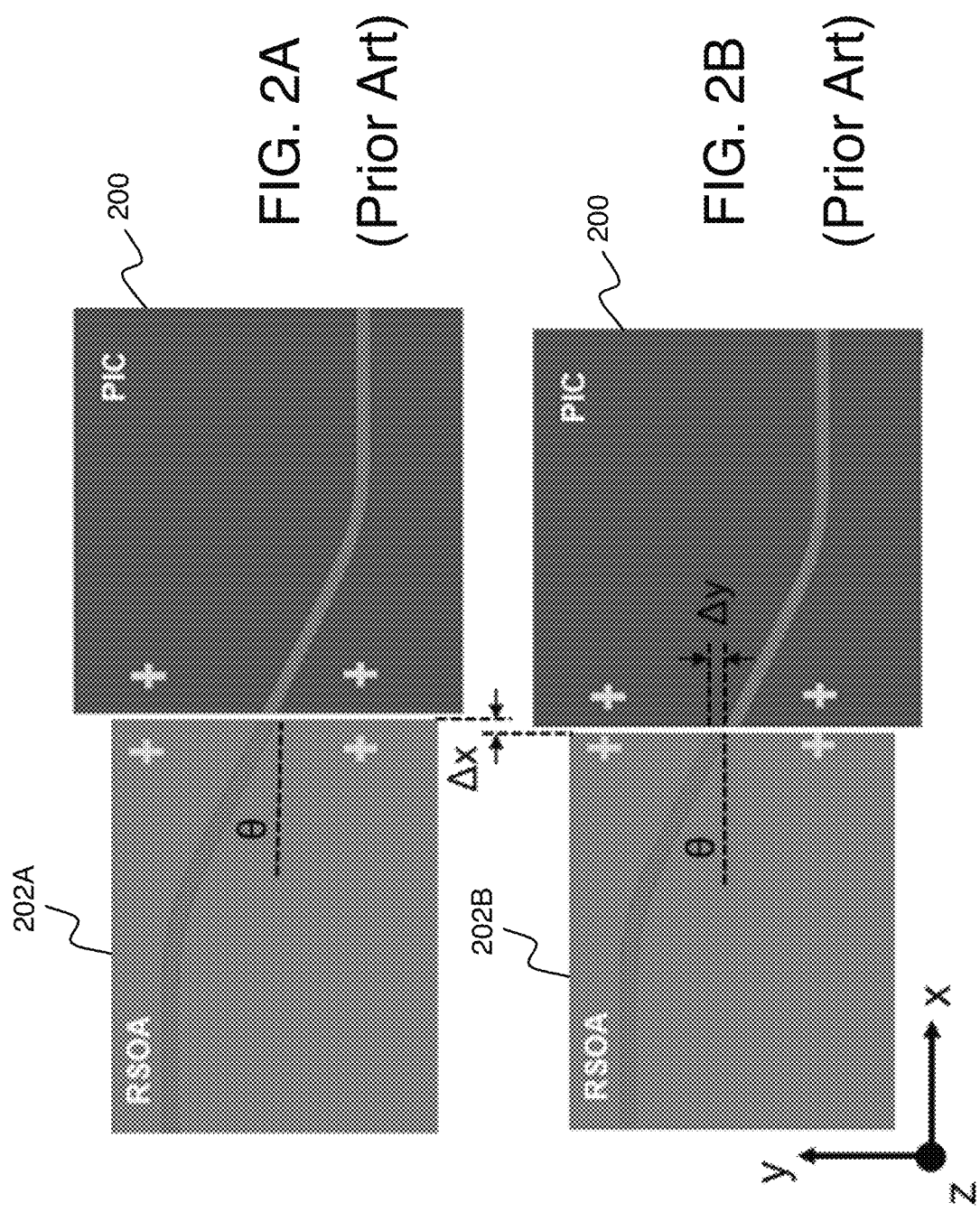

PHOTONIC DIE ALIGNMENT

CROSS-REFERENCE TO RELATED APPLICATION(S)

This application is a divisional application of U.S. application Ser. No. 16/815,655, entitled "Photonic Die Alignment," filed Mar. 11, 2020, which claims priority to and the benefit of U.S. Provisional Application Ser. No. 62/817,488, entitled "Low Back Reflection Self-aligned Integration of Light Sources into Photonic Integrated Circuits," filed Mar. 12, 2019 and U.S. Provisional Application Ser. No. 62/971,321, entitled "Alignment System For Heterogeneous Die-Level Photonics Integration," filed Feb. 7, 2020, each of which is incorporated herein by reference.

STATEMENT AS TO FEDERALLY SPONSORED RESEARCH

This invention was made with government support under contract no. HR0011-16-C-0108 awarded by DARPA. The government has certain rights in the invention.

TECHNICAL FIELD

This disclosure relates to photonic die alignment.

BACKGROUND

Photonic integrated circuits (PICs) enable transmission and manipulation of optical signals on the chip scale with miniaturized system footprints and energy consumption. To leverage the low cost, well established semiconductor process technology used in the Integrated Circuit (IC) industry, such as silicon-on-insulator (SOI) technology, can be used as a material platform for realizing PICs. Due to the relatively low efficiency of light sources or gain media built on silicon, the integration of light sources or gain media built on alien materials, such as III-V compound semiconductors, into the PICs is useful for a wide variety of applications including high speed data links, lab-on-a-chip sensors, and integrated LIDAR systems.

SUMMARY

In one aspect, in general, an apparatus comprises: a first photonic die having a first coupling edge and a first die surface perpendicular to the first coupling edge, the first photonic die comprising: a first waveguide extending in proximity to the first coupling edge; a portion of the first die surface forming an alignment edge substantially perpendicular to the first die surface and substantially parallel to the first waveguide; and a first alignment feature etched into or formed adjacent to the first coupling edge; and a second photonic die having a second coupling edge and a second die surface perpendicular to the second coupling edge, the second photonic die comprising: a second waveguide extending in proximity to the second coupling edge; a portion of the second die surface configured to form a receptacle sized to constrain a position of the alignment edge when the first photonic die and the second photonic die are substantially aligned with each other with the first coupling edge in proximity to and substantially parallel to the second coupling edge; and a second alignment feature etched into or formed adjacent to the second coupling edge and configured to enable alignment with the first alignment feature when the first photonic die and the second photonic die are substantially aligned with each other with the first coupling edge in proximity to and substantially parallel to the second coupling edge.

Aspects can include one or more of the following features.

The first waveguide has a propagation axis that is tilted at a nonzero angle with respect to an axis normal to the first coupling edge, and the second waveguide has a propagation axis that is tilted at a nonzero angle with respect to an axis normal to the second coupling edge.

The first alignment feature comprises a set of grooves including a first groove and a second groove.

The first groove comprises a first wall at a first angle with respect to the coupling edge, and a second wall at a second angle with respect to the coupling edge, where a bisector of the first angle and the second angle is substantially parallel to the propagation axis of the first waveguide or the propagation axis of the second waveguide, and the second groove comprises a first wall substantially parallel to the first wall of the first groove, and a second wall shifted so that the second groove is asymmetric with respect to the first groove.

The second alignment feature comprises a pair of curved protrusions including a first curved protrusion and a second curved protrusion.

The first curved protrusion and the second curved protrusion have cylindrical shapes and are substantially identical in size.

The alignment edge of the first die and the receptacle of the second die are configured to constrain: (1) translation along a first axis perpendicular to the first die surface, (2) rotation about a second axis perpendicular to the first coupling edge, and (3) rotation about a third axis perpendicular to both the first and second axes.

The first alignment feature and the second alignment feature are configured to constrain: (1) rotation about the first axis, (2) translation along the second axis, and (3) translation along the third axis.

In another aspect, in general, a method for passive alignment of a first photonic die having a first coupling edge and a first die surface perpendicular to the first coupling edge and a second photonic die having a second coupling edge and a second die surface perpendicular to the second coupling edge comprises: aligning the first photonic die with the second photonic die in a first alignment phase that includes: moving the first coupling edge of the first photonic die into proximity with the second coupling edge of the second photonic die; moving a first waveguide formed in the first photonic die and extending in proximity to the first coupling edge into proximity with a second waveguide formed in the second photonic die and extending in proximity to the second coupling edge; and constraining movement of the first photonic die with respect to the second photonic die along an axis that is substantially perpendicular to the first die surface and the second die surface based on contact between a structured portion of the first die surface and a structured portion of the second die surface; and aligning the first photonic die with the second photonic die in a second alignment phase that includes: moving a set of grooves formed in the first coupling edge into proximity with a corresponding set of curved protrusions formed in the second coupling edge; translating the first photonic die in a plane substantially parallel to the first die surface and rotating the first photonic die with respect to the second photonic die about an axis substantially perpendicular to the first die surface to contact the set of grooves with the set of curved protrusions.

Aspects can include one or more of the following features.

The first waveguide has a propagation axis that is tilted at a nonzero angle with respect to an axis normal to the first coupling edge, and the second waveguide has a propagation axis that is tilted at a nonzero angle with respect to an axis normal to the second coupling edge.

The set of grooves consists of a pair of grooves, and the set of curved protrusions consists of a pair of curved protrusions.

The method further comprises fixing alignment of the first photonic die and the second photonic die with a fixing material after contacting the pair of grooves with the pair of curved protrusions.

In another aspect, in general, an article of manufacture comprises: a photonic die having a coupling edge and a die surface perpendicular to the coupling edge; a waveguide formed in the photonic die and extending in proximity to the coupling edge; a first groove formed in the coupling edge, the first groove comprising a first wall at a first angle with respect to the coupling edge, and a second wall at a second angle with respect to the coupling edge, where a bisector of the first angle and the second angle is substantially parallel to the propagation axis of the waveguide; and a second groove formed in the coupling edge, the second groove comprising a first wall substantially parallel to the first wall of the first groove, and a second wall shifted so that the second groove is asymmetric with respect to the first groove.

Aspects can include one or more of the following features.

The waveguide has a propagation axis that is tilted at a nonzero angle with respect to an axis normal to the coupling edge.

The article of manufacture further comprises an alignment structure configured to constrain: (1) translation along a first axis perpendicular to the die surface, (2) rotation about a second axis perpendicular to the coupling edge, and (3) rotation about a third axis perpendicular to both the first and second axes.

The first groove and the second groove are configured to constrain: (1) rotation about the first axis, (2) translation along the second axis, and (3) translation along the third axis.

Aspects can have one or more of the following advantages.

In integrated photonics applications, it is frequently desirable to mate multiple dies based on disparate substrates and processes to take advantage of material systems that would be incompatible in a single monolithic wafer process. One such application involves attaching compound optical semiconductor chips to larger silicon photonics dies, allowing direct integration of optical gain media with chip-scale integrated optics to create on-chip lasers and optical amplifiers. Such integration can use flip-chip style die attach processes.

Among the various approaches for light source or gain medium integration, die/wafer bonding proves to be a promising solution due to its low cost, high throughput, and high scalability. However, major challenges remain for achieving high coupling efficiency, which often calls for sub-micron accuracy alignment and low loss mode conversion techniques. Previously, light source integration has been mostly focused on continuous wave (CW) sources such as distributed feedback lasers (DFBs). For example, four DFB lasers at equal wavelength spacing can be integrated into a four-channel wavelength division multiplexing (WDM) transceiver system. In such applications, as shown in FIGS. 1A and 1B, the light is usually coupled by edge-to-edge coupling from a photonic die (102A or 102B) containing a CW source to a photonic die containing a PIC (100A or 100B), with coupling waveguides arranged in the direction (along the x-axis) that is perpendicular to the coupling interface (in the y-z plane). The alignment is achieved by either alignment marks on both CW source photonic die and the PIC photonic die (also called "chips") (FIG. 1A) or physical stops inside the source mounting sites (FIG. 1B). Such alignment techniques are able to provide coarse alignment for translation in the x-y plane and rotation about the z-axis. But, additional fine alignment as part of fixing the chips together (e.g., using a fixing material such as an index-matching epoxy) may call for additional alignment techniques for the remaining axes (i.e., translation along the z-axis and rotation about the x-axis and y-axis), as described in more detail below. These alignment techniques can reduce, or eliminate, the need to rely on active alignment techniques, where optical signals are provided and optical power (or some other metric) is measured as a feedback mechanism during alignment, potentially speeding and simplifying the assembly process.

Additionally, in perpendicular coupling configurations as shown in FIGS. 1A and 1B, the non-negligible back reflection due to the index discontinuity at the coupling interface not only limits the coupling efficiency, but also potentially undermines the lasing stability of the source. And, it may be difficult to minimize the reflection without using materials such as index matching oils and/or anti-reflection (AR) coatings, which may lead to complicated fabrication procedures and/or packaging methods.

Alternatively, in some implementations, by using tilted coupling waveguides, it is possible to keep the back reflection under the $10^{-5}$ level with potentially simpler fabrication techniques. Low back reflection is useful especially for the integration of external gain media, such as reflective semiconductor optical amplifiers (RSOAs), into PIC systems. RSOAs offers cost effective solutions to integrated tunable light sources when combined with a tunable optical filter to form the so-called external cavity laser. And, it is possible to achieve continuous wavelength tuning over S, C, and L bands for telecommunication related applications. Due to their open cavity structure, RSOAs are extremely sensitive to Rayleigh back scattered or reflected power, and tilted waveguide coupling can be used to keep the back reflection under $10^{-5}$. The various techniques described herein can facilitate photonic die alignment for integrating RSOAs and a variety of other types of light sources with various types of PICs. Some of the techniques solve certain potential misalignment errors that can occur with tilted coupling waveguides, as described in more detail below.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 2A and 2B are schematic diagrams of examples of photonic die alignment showing effects of edge formation error.

DETAILED DESCRIPTION

While some of the techniques described herein will refer to particular types of photonic die (e.g., an RSOA chip or other light source) with another particular type of photonic die (e.g., a PIC chip), the techniques can generally be applied for aligning any of a variety of different types of heterogeneous die. Some of the techniques described herein facilitate precise passive alignment of chips with either perpendicular coupling waveguides or tilted coupling waveguides. In the case of tilted coupling waveguides, additional benefits can be achieved with some of the techniques that alleviate certain kinds of errors. For example, straight cross-shaped alignment marks may not be useful for all high precision alignment purposes due to the error in the chip edge formation of the light source and/or the PIC chips using either a dicing, etching, or cleaving process. FIGS. 2A and 2B illustrate an example in which both coupling edges of a PIC chip 200 and an RSOA source chip 202A are formed as designed (FIG. 2A) compared to an example in which an RSOA source chip 202B has a coupling edge that has been formed with an error in the distance between that coupling edge and the alignment marks (FIG. 2B). As shown in FIGS. 2A and 2B, the relationship between the edge formation error in the x direction and the misalignment in the y direction is $$\Delta y = \tan \theta \Delta x$$

where $\Delta x$ is the accumulated edge formation error in the x direction, and $\theta$ is the tilt angle of the coupling waveguide. The tilt angle, between 0 and 90 degrees, is typically between 5 degrees and 15 degrees. Assuming an extreme 45° tilt angle, an edge formation error as small as half micron, which is common for state-of-the-art dicing or cleaving machinery, will result in complete misalignment between the coupling waveguides designed for single mode operation at telecommunication wavelengths. Similar misalignment also potentially exists for errors associated with forming structures in the physical stop case with a rectangular bonding site.

Figures 1A, 1B:
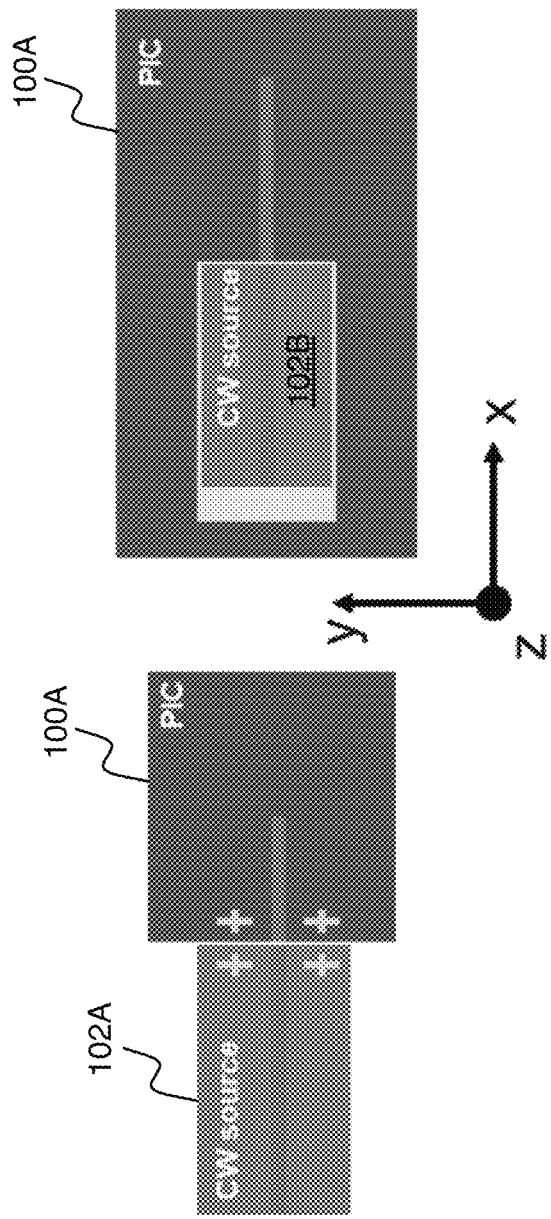
FIGS. 1A and 1B are schematic diagrams of examples of photonic die alignment.
Figure 3:
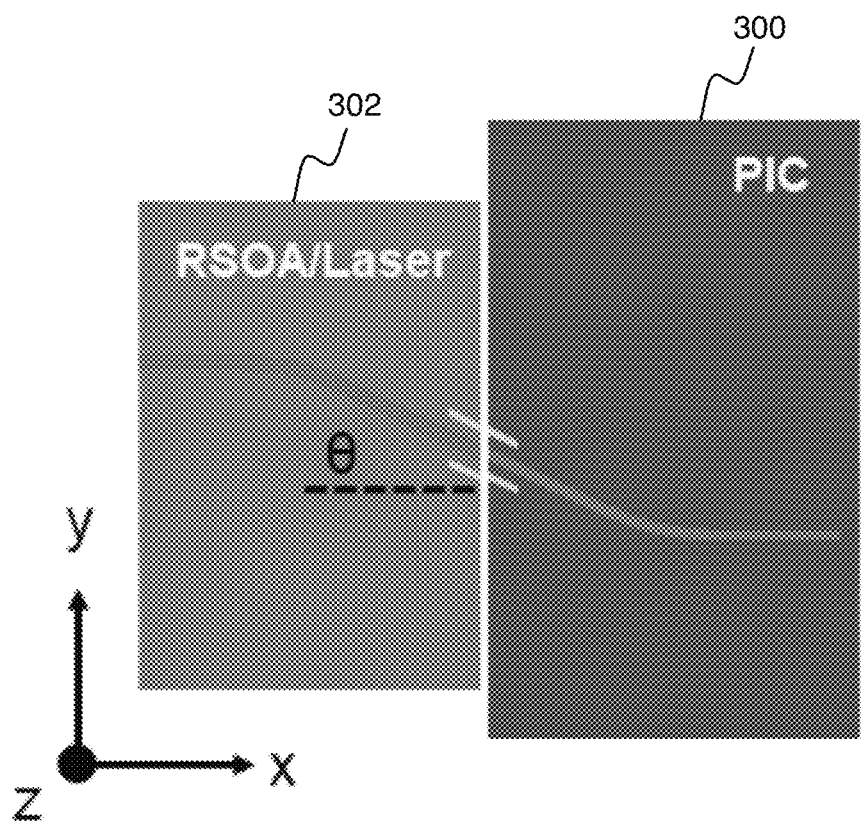
FIG. 3 is a schematic diagram of an example of photonic die alignment with tilted alignment marks.

One way to address this issue is with alignment marks and/or physical boundaries that are tilted at the same angle as the coupling waveguide. The use of tilted alignment features is capable of high precision alignment for tilted coupling waveguides, and has high tolerance for fabrication error in forming the coupling edge. For example, as shown in FIG. 3, tilted alignment marks on both a PIC chip 300 and an RSOA/laser source chip 302 can be used to replace the straight cross-shaped alignment marks to guarantee an aligned condition under the influence of certain possible errors in chip edge definition. Even if the position of the edge along the x-axis is shifted from a designed position (e.g., due to an error in the cleaving process), the tilted alignment marks will still enable the tilted waveguides to be aligned within designed tolerances.

Figure 4A:
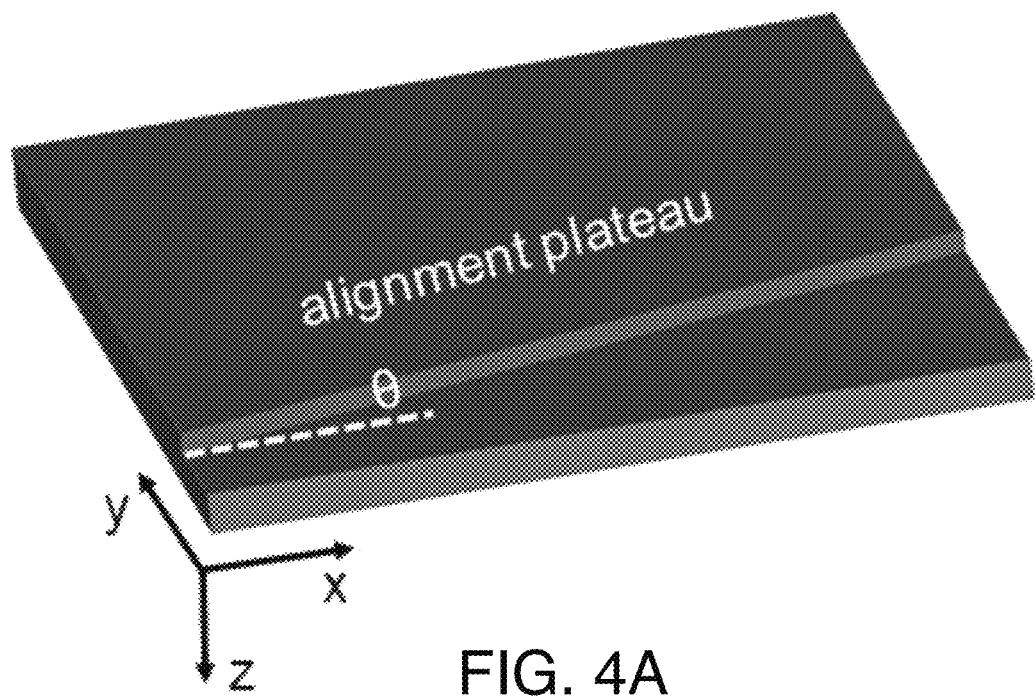
FIGS. 4A and 4B are schematic diagrams of example laser source and photonic die alignment using a single tilted alignment edge.
Figure 4B:
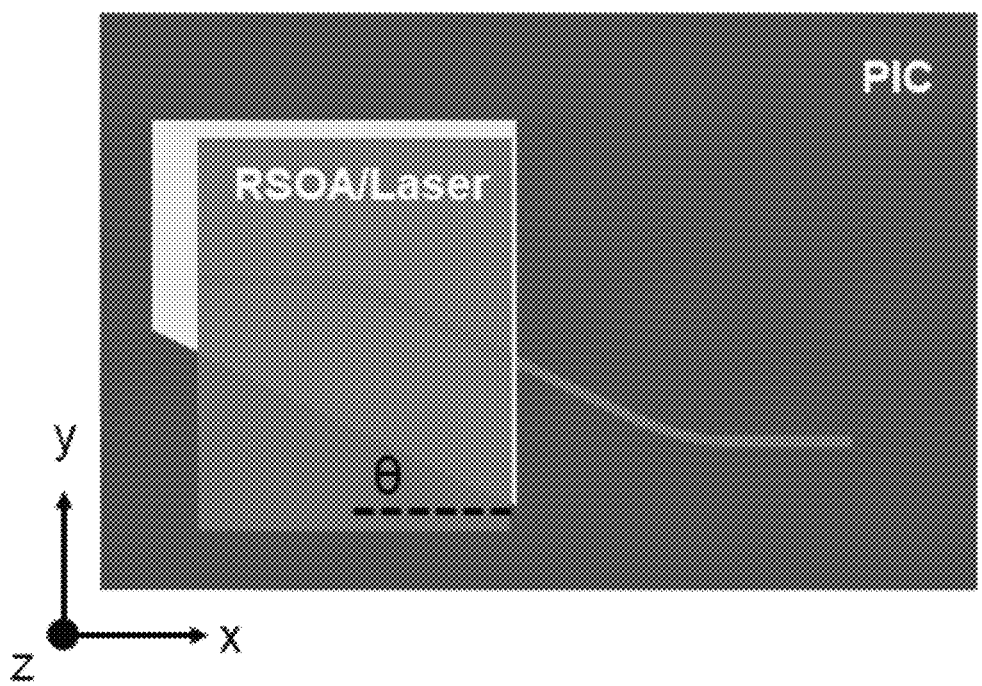
Figure 4C:
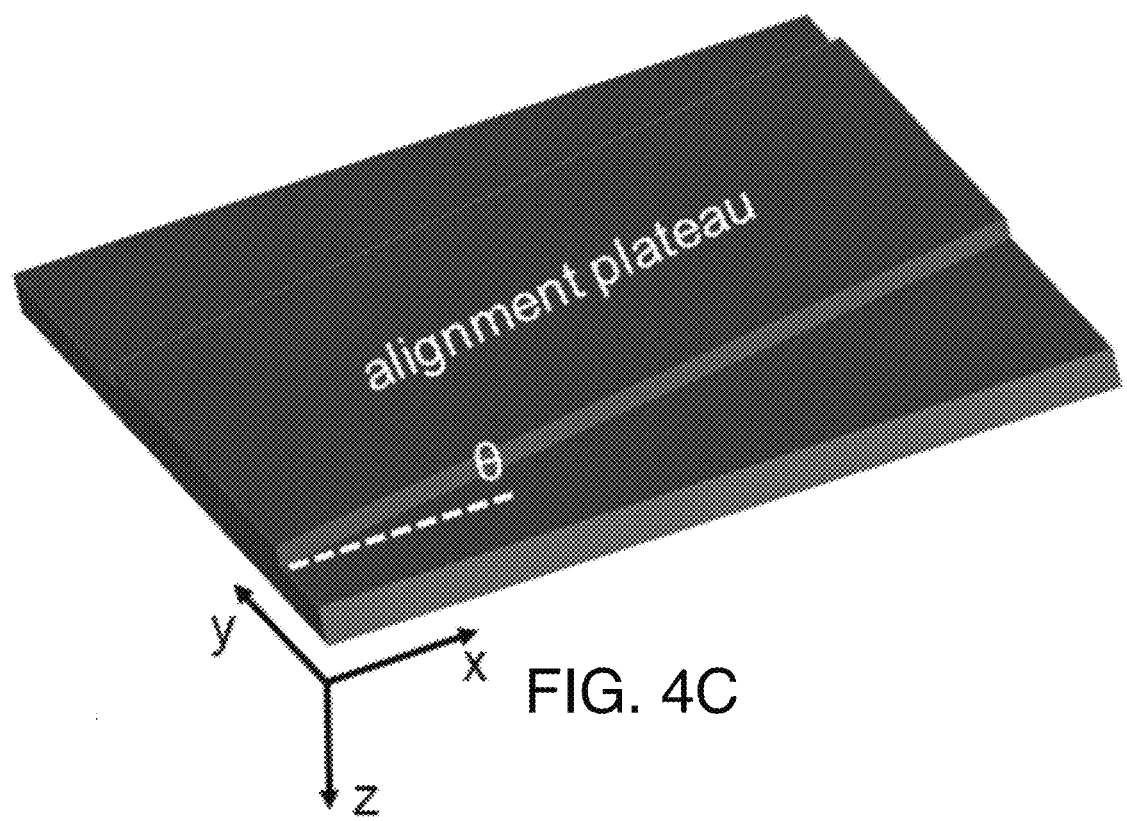
FIGS. 4C and 4D are schematic diagrams of example laser source and photonic die alignment using two tilted alignment edges.
Figure 4D:
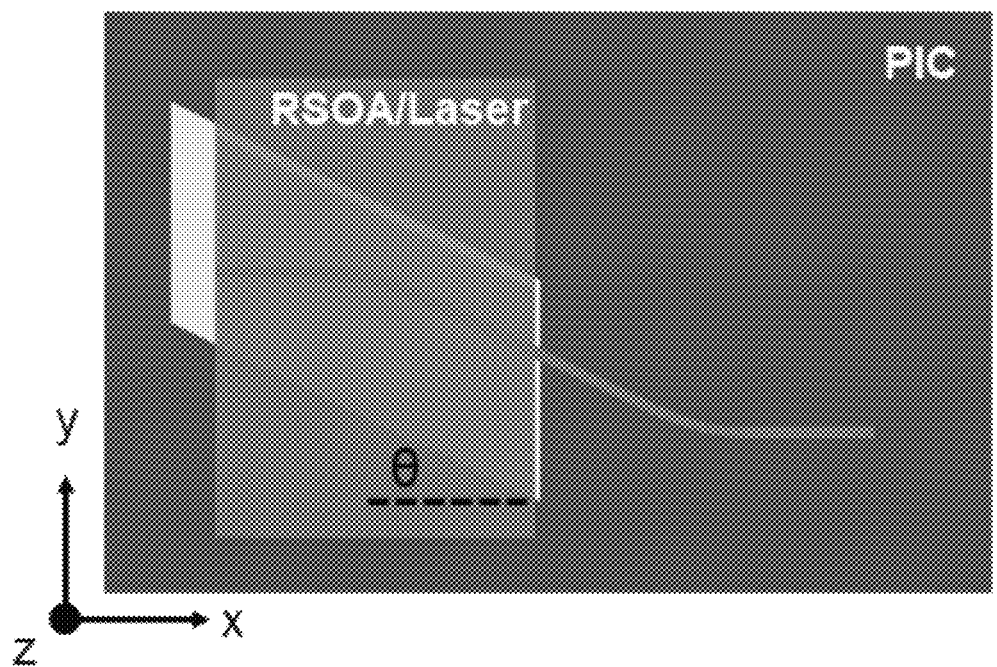

A similar technique can also be applied to self-aligned integration where tilted physical boundaries of both the light source chip and the bonding site on the PIC chip are used to achieve locked alignment condition regardless of the movement of the coupling edges, as shown in FIGS. 4A-4D. To be compatible with the state-of-art CMOS fabrication techniques, an alignment plateau with one or more tilted physical boundaries can be formed on the light source chip (e.g., an RSOA or laser) by patterning and etching the bonding side of the chip. At least one tilted physical boundary is used as the alignment stop, as shown in FIG. 4 (A. FIG. 4B shows a top view of the light source chip of FIG. 4A after it has been aligned and bonded to a PIC chip with a receptacle sized to constrain a position of the alignment edge. Another example in which two tilted physical boundaries at the same angle are used for better control and guidance during the alignment of the light source chip to the PIC chip in the bonding process is shown in FIG. 4C. FIG. 4D shows a top view of the light source chip of FIG. 4C after it has been aligned and bonded to a PIC chip with a receptacle sized to constrain a position of the alignment edge. In both examples, flip-chip bonding technique can be employed for self-alignment using the one or more tilted alignment plateaus on the light source chip and the tilted physical stops inside the receptacle adjacent to the bonding site of the PIC chip.

The alignment techniques described herein can be applied to integrating a variety of different types of sources, including CW sources such as DFB lasers or tunable sources such as RSOAs based external cavity lasers with significantly reduced back reflection, and at the same time, high precision in-plane alignment with high tolerance for fabrication error in dicing/cleaved edge. Moreover, the alignment in the vertical (out-of-the-plane) direction along the z-axis can be managed independently through etched pillars and/or precisely controlled laser pit depth and/or solder layer thickness, any of which is by no means limited by the alignment techniques described herein.

Direct integration of multiple dies, each of which contains one or more edge-coupled photonic waveguides, calls for extremely precise alignment of the waveguides. Even sub-micrometer transverse misalignments can incur significant coupling losses. As described above, coupling waveguides fabricated at oblique angles with respect to die edges can be used in order to reduce back reflections from the facet. In some cases, due to refraction effects in varying media, mating waveguides in different materials may be placed at different physical angles, which in turn are different from the angle of the emerging beam in the gap between dies. Finally, as described above, depending on the manufacturing method used, the precise location of the chip edge facet may vary.

Some techniques for addressing these integration challenges involve active alignment, such as visual microscope systems using straight or tiled pre-defined alignment marks, or else active feedback collected by energizing some portion of the system under test to optimize a performance figure of merit while the alignment is adjusted. In addition, passive systems can use a set of planar stop features to passively set vertical alignment and wedge correction, reducing the degrees of freedom required for active alignment from six to three.

In addition to the alignment techniques described above, a kinematic system of two-dimensional alignment features, formed from photolithographically defined edge facets on two dies, can be used to provide three-axis in-plane passive alignment between the dies. Used in conjunction with the planar stop system described above (e.g., in FIGS. 4A-4D), this example edge-facet design enables fully passive six-axis alignment with accuracies driven by the lithographic manufacturing tolerances of the relevant features.

The principle of kinematic alignment is based on the concept of near-perfect Hertzian point contacts between two surfaces, at least one of which is curved. Each contact point defines a constraint line through the contact point in the direction of the contact normal. When multiple constraints are imposed, the motions of the system are defined by the intersections of those constraints. Two intersecting constraint lines permit a rotation around the intersection point, while two parallel constraint lines permit a translation in the parallel direction. Some kinematic coupling or alignment systems are designed on the principle of exact constraint, such that the number of contact surfaces is equal to the number of degrees of freedom in the system, and the contact surfaces are arranged to allow no motion when engaged. Thus, a full six-axis (3-D) coupler would use six contact points, while a three-axis (2-D) coupler would use three contact lines.

Examples of the techniques described herein are based on designs of kinematic coupling structures adapted to the planar geometries typically encountered in semiconductor fabrication processes. It is assumed that vertical (z-axis) motions are constrained by any of a variety of methods, such as non-kinematic stop features (e.g., as shown in FIGS. 4A-4D) or active alignment. This example complements such structures to provide in-plane alignment of two dies by mating high-quality vertically patterned sidewall structures, as shown in FIGS. 5A-5C.

Figure 5A:
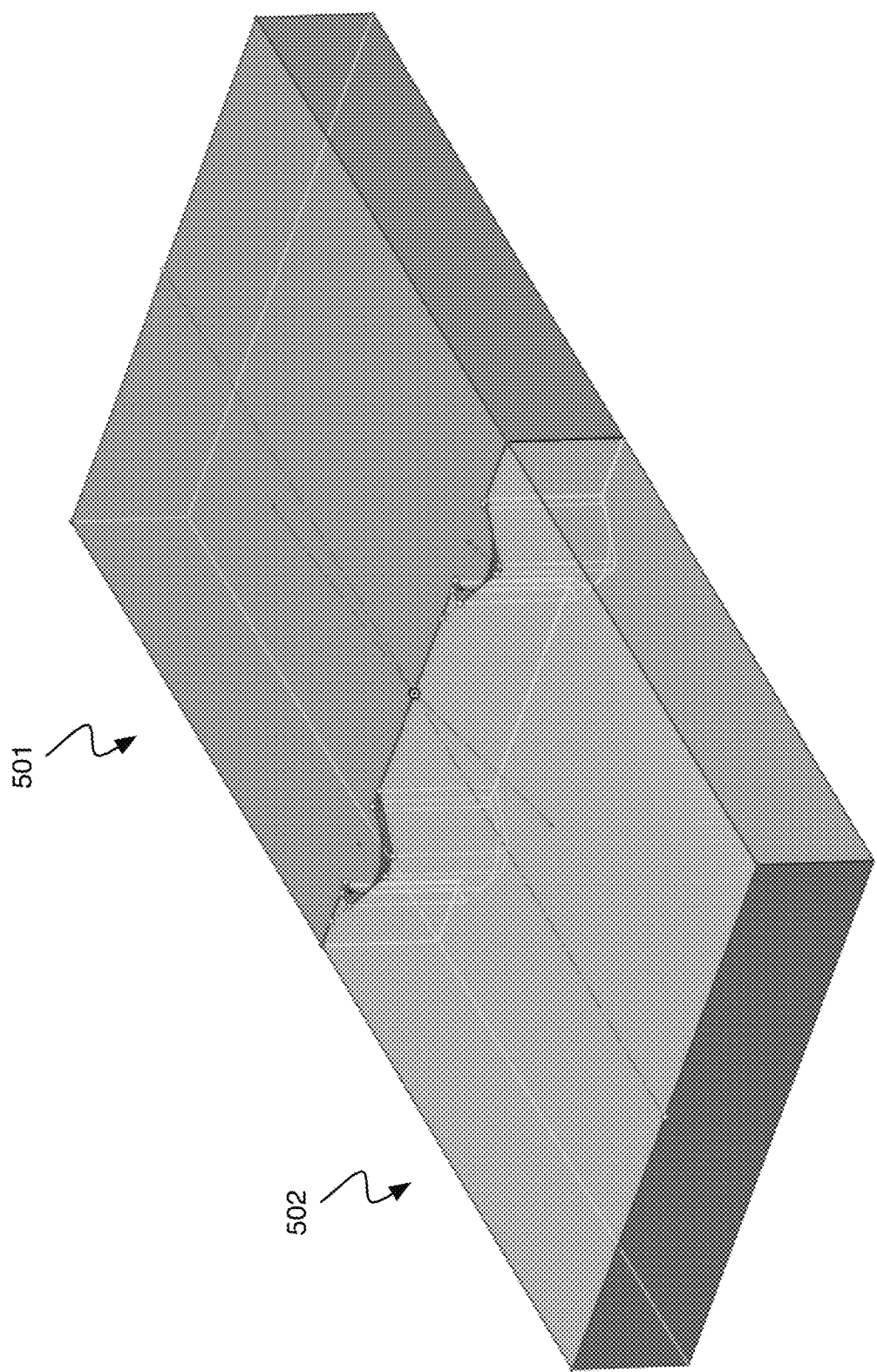
FIG. 5A is a perspective view of alignment between alignment features edged into coupling edges of photonic dies.
Figure 5B:
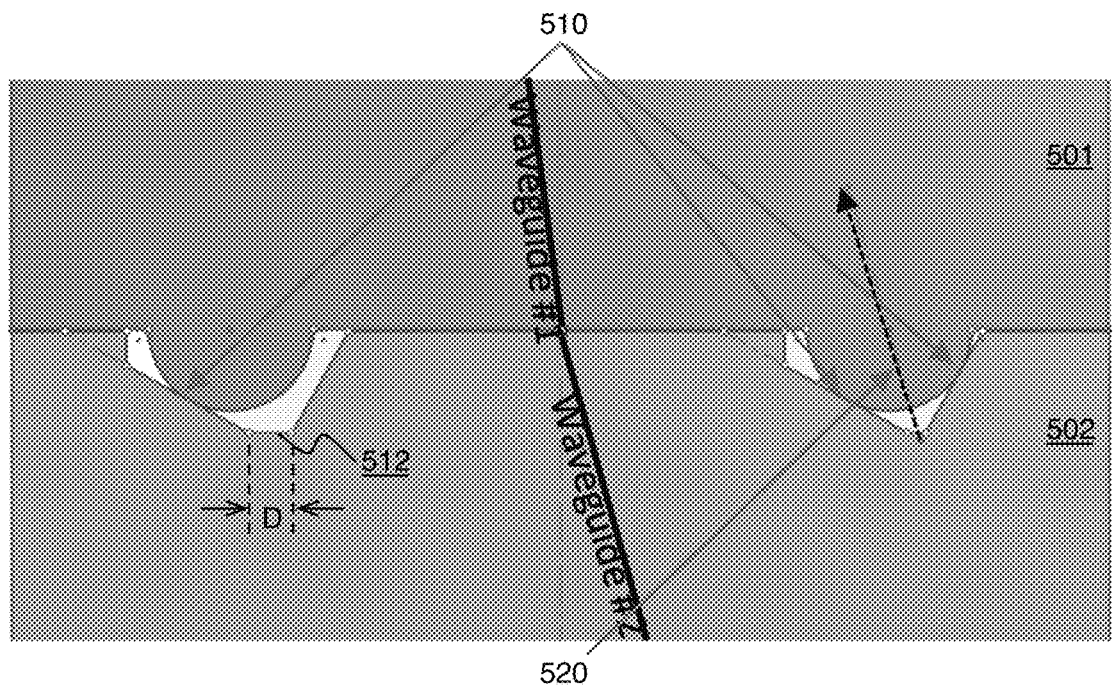
FIGS. 5B and 5C are top views of aligned photonic dies without and with certain lithographic errors, respectively.
Figure 5C:
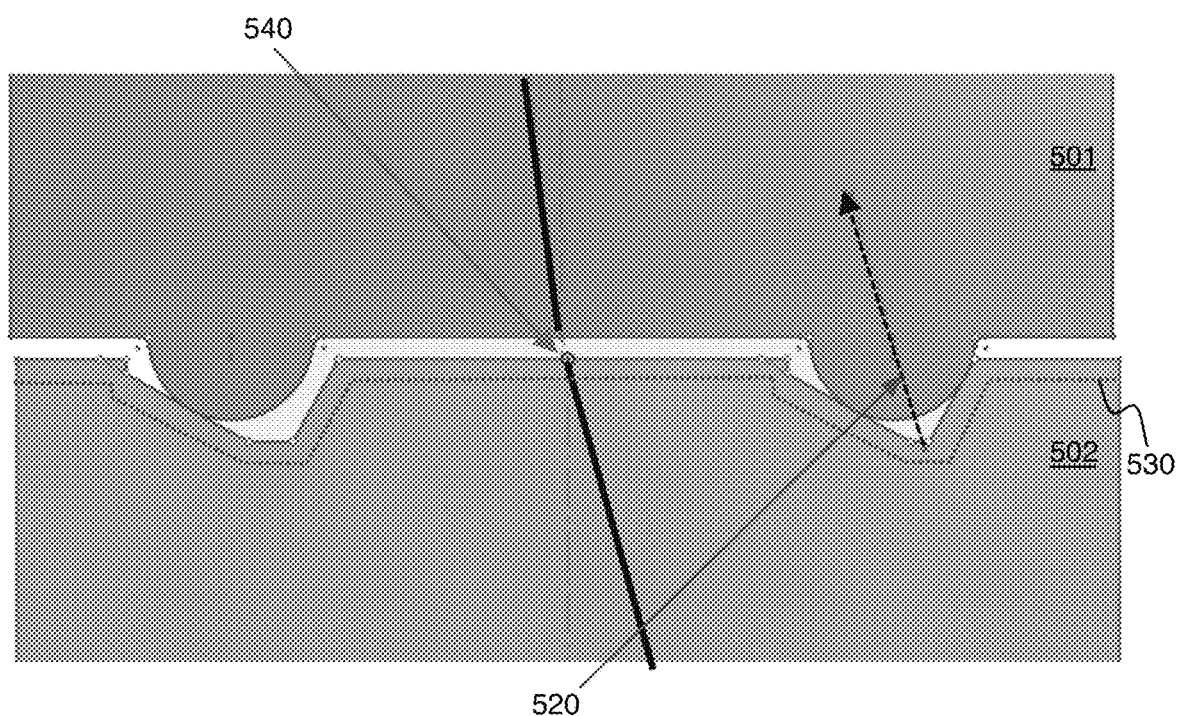

Referring to FIG. 5A, illustrating a planar 3-axis alignment system, there are three contacts between alignment features of a first die 501 (e.g., a PIC chip) and a second die (e.g., a laser chip). The first die 501 has a coupling edge on which there are two curved protrusions, which have a cylindrical shape (a portion of its surface overlapping with a portion of a surface of a cylinder), and a circular cross section (a portion of its cross section overlapping with a portion of a circle) in the plane perpendicular to the edge being coupled. The second die 502 has a coupling edge on which there are two grooves having sidewalls that are formed to mate with the curved protrusions along particular lines based on the number of remaining degrees of freedom. In this example, one groove is configured to contact its mated protrusion at lines along two sidewalls, and the other groove is configured to contact its mated protrusion at a line along one sidewall (with the other sidewall configured to not contact the mated protrusion at all to prevent overconstraint). So, with 3 degrees of freedom remaining, this example design calls for only 3 contact lines between the alignment surfaces, as illustrated in FIGS. 5A-5C. Alternatively, in other implementations, the protrusions can have a different shape (e.g., spherical instead of cylindrical) such that they make contact with the grooves at 3 points instead of along 3 lines.

One aspect of this example is the application of kinematic coupling technology to enable high accuracy passive alignment of optical structures on separately fabricated dies, by fabricating the mechanical alignment features directly in die or trench sidewalls, as depicted in FIG. 5A. The process integration can make use of features built during existing pattern steps during the microfabrication process flow. The nature of exact-constraint kinematic design enables sub-micron repeatability even when the mating structures are orders of magnitude larger.

Another aspect of this example pertains to a priori alignment accuracy. In some cases, machined kinematic couplings are capable of achieving sub-micron repeatability across mate-unmate cycles, but are not capable of accurately placing their mated structures to a pre-determined point due to manufacturing tolerances. In contrast, the microlithographic processes used to define the etched sidewalls have micron-scale tolerances for repeatability and alignment with respect to on-die features such as waveguide #1 in die 501 and waveguide #2 in die 502 shown in FIG. 5B. In addition, the structure of the alignment features (e.g., the angles of the sidewalls relative to the waveguide angles) is configured to be tolerant to certain non-fidelity modes associated with microlithographic patterning processes. For example, one common pattern non-fidelity mode manifests as a uniform growth or shrinkage in the pattern perimeter (with respect to a nominal as-designed pattern).

This point enables the design of alignment structures that, in addition to repeatable alignment, can also provide high predictive accuracy and predictable response to manufacturing variances. For example, some forms of manufacturing variance arise due to one or more of: variation in optical exposure of photoresist that is being patterned for use in an etching process, uncertain times for developing the exposed photoresist, undercutting of the photoresist during etching (e.g., due to any of a variety of physical or chemical effects). The resulting etching process may generate structures that are uniformly smaller or larger than the designed pattern.

Specifically, this example design employs alignment structures that are formed to provide controlled movement in the event of a uniform fabrication error, as shown in FIGS. 5B and 5C. In particular, the die 502 includes a left groove that contacts a left protrusion of the die 501 at one of the three contact lines 510, and a right groove that contacts a right protrusion of the die 501 at the other two of the three contact lines 510. The left groove includes an additional edge 512 that is not part of the right groove, shifting the right sidewall by a distance D so that the left groove is asymmetric with respect to the right groove. This asymmetry allows the equal sized protrusions to make contact at only three lines rather than four. Alternatively, instead of making the grooves of the die 502 asymmetric with respect to each other, the protrusions on the die 501 could have different shapes (e.g., different radii of curvature). However, preserving symmetry of the grooves with respect to each other provides certain advantages such as alignment of an error translation direction, as described in more detail below. The groove sidewall angles are such that the two left sidewalls of the respective grooves, which contain contact lines, are parallel to each other, and the right sidewall of the right groove, which contains the third contact line, is at an angle such that a bisector 520 of the sidewalls of the right groove (both of which contact the right protrusion) is substantially parallel to the waveguide #2 in the die 502. It can be shown by symmetry or kinematic loop analysis, for example, that a uniform expansion or shrinkage of the perimeter of either alignment structure (i.e., the protrusions or the grooves) will result in the two structures linearly translating along a vector parallel to the bisector of the groove sidewall angles, as shown in FIG. 5C, where the die 502 has a coupling edge that is extended uniformly beyond a designed edge perimeter 530. So, light that exits the coupling waveguide of the die 502 from an exit point 540 can continue to propagate and couple into the coupling waveguide of the die 501 with relatively high efficiency. Thus, in addition to an a priori high accuracy (due to the microfabrication processes employed), this example design reduces the sensitivity to the most common microscopic process variance to translation on a single vector, which can be selected by the designer. In other examples, the sidewall angles can be configured such that the bisector 520 is substantially parallel to the waveguide #1 in the die 501, or such that the bisector 520 is between the angles of the two waveguides begin coupled.

This example design methodology is in contrast to other kinematic coupling designs, which may arrange mating features in non-parallel patterns so as to maximize structural rigidity of the mechanical coupling. Instead, this example compromises the structural rigidity slightly in favor of predictable effect with respect to manufacturing variances.

Another aspect of this example involves the employment of these structures for the highly accurate alignment of integrated photonic sub-dies for the purpose of large-scale, high-speed, low-cost integration of differing substrate types. In particular, one application involves the alignment of integrated optical waveguides in compound semiconductor gain media dies with mating waveguides in a silicon photonics die. These techniques can be combined with other techniques such as active alignment, either using visible registration marks or else with active stimulation of the photonic circuit to measure the alignment quality during the alignment process.

After a first alignment phase (e.g., a course alignment phase) bringing the coupling edges in proximity to each other (e.g., using physical stops), a second alignment phase (e.g., a fine alignment phase) can use mechanical passive alignment structures to align a pair of dies by applying a small mating force to the pair of dies while the fixing process (e.g., soldering or gluing a fixing material) is performed. This can speed the process of die-to-die integration while reducing the process equipment required.

Another aspect of this example involves optimizing these mating structures for the application of waveguide coupling. A particular challenge of this alignment process is related to the fact that in such designs, waveguides typically emerge from an edge coupler at an angle, so as to minimize undesired reflections. Due to optical index variations in the disparate media, the physical angles of the waveguides at the mating point may be different.

The coupling efficiency of such interfaces is extremely sensitive to transverse misalignment, but much less sensitive to translations along the optical axis defined by the transmitted light propagating in the gap between chips. This fact allows the designer, or a design program, to align the error translation direction of the kinematic coupling (e.g., the bisector 520 show in FIGS. 5B and 5C) with the insensitive axis of the optical connection. The designer may align this direction with the physical orientation of the waveguide in either die (e.g., waveguide #1 or waveguide #2 in FIG. 5B), in the intervening medium between dies (e.g., an index-matching epoxy, or air), or a compromise angle between these choices. In some implementations, the bisector 520 can be selected to be more closely aligned to the waveguide in the die with a larger process variation.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for passive alignment of a first photonic die having a first coupling edge and a first die surface perpendicular to the first coupling edge and a second photonic die having a second coupling edge and a second die surface perpendicular to the second coupling edge, comprising:
    aligning the first photonic die with the second photonic die in a first alignment phase that includes:
        moving the first coupling edge of the first photonic die into proximity with the second coupling edge of the second photonic die;
        moving a first waveguide formed in the first photonic die and extending in proximity to the first coupling edge into proximity with a second waveguide formed in the second photonic die and extending in proximity to the second coupling edge; and
        constraining movement of the first photonic die with respect to the second photonic die along an axis that is substantially perpendicular to the first die surface and the second die surface based on contact between a structured portion of the first die surface and a structured portion of the second die surface; and
    aligning the first photonic die with the second photonic die in a second alignment phase that includes:
        moving a set of grooves formed in the first coupling edge into proximity with a corresponding set of curved protrusions formed in the second coupling edge;
        translating the first photonic die in a plane substantially parallel to the first die surface and rotating the first photonic die with respect to the second photonic die about an axis substantially perpendicular to the first die surface to contact the set of grooves with the set of curved protrusions.

2. The method of claim 1, wherein the first waveguide has a propagation axis that is tilted at a nonzero angle with respect to an axis normal to the first coupling edge, and the second waveguide has a propagation axis that is tilted at a nonzero angle with respect to an axis normal to the second coupling edge.

3. The method of claim 1, wherein the set of grooves consists of a pair of grooves, and the set of curved protrusions consists of a pair of curved protrusions.

4. The method of claim 1, further comprising fixing alignment of the first photonic die and the second photonic die with a fixing material after contacting the pair of grooves with the pair of curved protrusions.

* * * * *